United States Patent
Luis (10) Patent No.: US 12,491,525 B2
(45) Date of Patent: Dec. 9, 2025

(54) PIPE OF A BLOWING MACHINE

(71) Applicant: SAINT-GOBAIN ISOVER, Courbevoie (FR)

(72) Inventor: David Luis, Rantigny (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 726 days.

(21) Appl. No.: 17/873,539

(22) Filed: Jul. 26, 2022

(65) Prior Publication Data
US 2023/0021580 A1    Jan. 26, 2023

(30) Foreign Application Priority Data

Jul. 26, 2021  (FR) ........................................ 2108067

(51) Int. Cl.
*B05B 7/14*    (2006.01)
*E04F 21/08*    (2006.01)

(52) U.S. Cl.
CPC .......... *B05B 7/1409* (2013.01); *E04F 21/085* (2013.01)

(58) Field of Classification Search
None
See application file for complete search history.

(56) References Cited

U.S. PATENT DOCUMENTS

| | | | |
|---|---|---|---|
| 5,921,055 A | 7/1999 | Romes et al. | |
| 7,845,585 B2 * | 12/2010 | Evans | E04F 21/085 241/60 |
| 10,287,109 B2 * | 5/2019 | Sørensen | B65G 51/02 |
| 10,412,879 B2 * | 9/2019 | Cruson | B65G 53/58 |
| 12,428,859 B2 * | 9/2025 | Luis | E04F 21/12 |

FOREIGN PATENT DOCUMENTS

| DE | 20 2020 102223 U1 | 7/2021 |
|---|---|---|
| FR | 2 829 044 A1 | 3/2003 |

OTHER PUBLICATIONS

Search Report as issued in French Patent Application No. 2108067, dated Apr. 1, 2022.

* cited by examiner

*Primary Examiner* — William R Harp
(74) *Attorney, Agent, or Firm* — Pillsbury Winthrop Shaw Pittman LLP (57) ABSTRACT

A pipe for the aeraulic transport of a loose-fill insulation product for a machine for blowing the insulating product, the pipe extending along a longitudinal main elongation direction and including at least one cylindrical wall which delimits a space configured for the circulation at least of the loose-fill insulating product, wherein, in the pipe, the cylindrical wall includes a plurality of sections, at least two of the sections each including at least one evacuation orifice so as to form at least two perforated sections, the pipe including at least two shutoff devices that are movable in translation along the longitudinal direction about the cylindrical wall, each of the shutoff devices being able to cover specifically one of the perforated sections.

19 Claims, 5 Drawing Sheets

PIPE OF A BLOWING MACHINE

CROSS-REFERENCE TO RELATED APPLICATIONS

This application claims priority to French Patent Application No. 2108067, filed Jul. 26, 2021, the entire content of which is incorporated herein by reference in its entirety.

FIELD

The present invention relates to a machine for blowing a loose-fill insulating product, such as glass wool, rock wool, cellulose wadding, cotton fibers or any other similar materials, the blowing machine comprising a pipe for spraying said loose-fill insulating product.

BACKGROUND

It is commonplace to use loose-fill insulating products to insulate a dwelling, and more particularly to insulate roof spaces of such a dwelling. The use of a blowing machine thus makes it easier to spray the insulating product in the dwelling, by blowing the insulating product using pressurized air at a high flow rate. More specifically, the insulating product is sprayed by means of a pipe, which is fluidically connected to a base of the blowing machine within which the air and said loose-fill insulating product are mixed. The pressure and the flow rate of the air in the pipe then need to be high enough for it to be possible to transport the insulating product from the base of the blowing machine to an outlet of the pipe.

This need for a high air pressure to carry out the spraying of insulating product needs, however, to be offset by the drawbacks that too powerful spraying of insulating products may bring about, these including, non-exhaustively, the raising of dust when the loose-fill insulating product is sprayed in dwelling roof spaces and/or the excessive compacting of the loose-fill insulating product, which can bring about less effective insulation.

SUMMARY

Therefore, an aspect of the present invention is to remedy the abovementioned drawbacks by providing simple means that are applicable to existing blowing machines, making it possible to increase the maneuverability of the pipe and the precision of the spreading of the loose-fill insulating product in the zone to be insulated of the dwelling.

An aspect of the invention therefore relates to a pipe for the transport of a loose-fill insulation product for a machine for blowing the insulating product, the pipe extending along a longitudinal main elongation direction and comprising at least one cylindrical wall which delimits a space configured for the circulation at least of the loose-fill insulating product, the cylindrical wall comprising at least a first end portion and a second end portion that are opposite ends from one another along the longitudinal direction, wherein, in the pipe, the cylindrical wall comprises a plurality of sections between its first end portion and its second end portion, at least two of the sections each comprising at least one evacuation orifice so as to form at least two perforated sections, the pipe comprising at least two shutoff devices that are movable in translation along the longitudinal direction about the cylindrical wall, each of the shutoff devices being able to cover specifically one of the perforated sections.

The blowing machine can be used to spray the loose-fill insulating product, for example glass wool, in a zone to be insulated of a dwelling, for example roof spaces. More specifically, the pipe of the blowing machine makes it possible to spray a mixture made of pressurized air and insulating product in the zone to be insulated, the mixture being created in a base of the blowing machine. More specifically, the pressurized air in the pipe makes it possible to spray the loose-fill insulating product from the first end portion of the cylindrical wall of the pipe to at least the second end portion of the cylindrical wall of the pipe, respectively forming the inlet and the outlet of the pipe, in the direction of the zone to be insulated of the dwelling. The at least one evacuation orifice of each of the at least two perforated sections then allows air to pass from the interior of the pipe to the exterior of said pipe in order to reduce the pressure and the flow rate of air in the pipe and thus to adjust the outlet flow rate of the mixture without otherwise modifying the flow rate of air in the base of the blowing machine. To this end, the at least one evacuation orifice of each of the at least two perforated sections is configured to open both onto the interior of the pipe and onto the exterior of the pipe. Reducing the outlet flow rate makes it possible in particular to avoid the raising of dust that may be present in the zone to be insulated, and/or to prevent the sprayed loose-fill insulating product from being excessively compacted in the final insulation, under the effect of too high a pressure of the air sprayed simultaneously with the loose-fill insulating product, and the invention makes it possible to achieve these benefits without reducing the flow rate of air at the inlet of the blowing machine, which would have the effect of causing the loose-fill insulating product to circulate within the pipe at too low a speed to be sprayed correctly at the pipe end.

According to an aspect of the invention, each of the shutoff devices is able to cover specifically one of the perforated sections, meaning that each shutoff device is associated with one of the perforated sections. A clearing position of a shutoff device implies that it does not cover any of the perforated sections and a covering position of this shutoff device implies that it only covers the perforated section that is associated with it. As a result, each shutoff device has an effect only on the perforated section that is associated with it in order to vary the passage of air through the evacuation orifices, in particular allowing it to pass through or preventing it from passing through the evacuation orifice. The multiplicity of shutoff devices and the fact that they are specifically associated with a perforated section allow the user of the pipe to finely adjust the flow rate and the pressure of the air in the pipe and therefore the power at which the loose-fill insulating product is sprayed, by covering or not covering all of the perforated sections depending on the number of shutoff devices moved.

According to one feature of the invention, at least two of the sections are clearing sections separate from the perforated sections, each shutoff device being able to take up a covering position in which it is next to one of the perforated sections and a clearing position in which it is next to one of the clearing sections.

It will be understood that the clearing sections are sections that do not comprise an evacuation orifice. Thus, when the shutoff devices are positioned so as to cover the clearing sections, the air can pass through the evacuation orifices formed in the perforated sections, whereas when the shutoff devices of positioned so as to cover the perforated sections, said shutoff devices prevent the air from passing through said evacuation orifices.

According to one feature of the invention, the shutoff devices and the associated perforated section are configured such that the shutoff devices completely covers the perforated section in the covering position. For each pair formed by a shutoff device and its perforated section, the perforated section can only be in a completely open position, without being covered, or in a completely closed position, entirely covered by the shutoff device.

According to one alternative of the invention, the shutoff device may be configured to take up at least one intermediate position between the completely open position and the completely closed position. In other words, the intermediate position corresponds to a position of the shutoff device in which the latter covers only a part of the perforated section. It should be understood that, in this case, the intermediate position is a position in which the shutoff device can be stopped so as to partially cover the corresponding perforated section, this intermediate position being able to be repeated reliably on each use, if necessary.

According to one feature of the invention, the at least two perforated sections are disposed one after the other along the longitudinal direction of the pipe, the at least two clearing sections being disposed one after the other along the longitudinal direction of the pipe.

According to one alternative of the invention, the perforated sections are disposed in a manner alternating with the clearing sections, along the longitudinal direction of the pipe. In other words, one of the perforated sections is flanked by two clearing sections along the longitudinal direction of the pipe, and/or vice versa.

According to one feature of the invention, the plurality of sections are formed on a module of the cylindrical wall which is arranged between the first end portion and the second end portion of the cylindrical wall of the pipe. This module may be produced separately from the two end portions and then attached and fixed in a sealed manner to each of the end portions, or may be produced integrally with at least one of these end portions.

According to one feature of the invention, the module comprises stop members for the movement in translation of the shutoff device. More specifically, the stop members block the longitudinal movement in translation of the shutoff device about the module and make it possible to ensure that a shutoff device is positioned next to a perforated sections in order for it to take up an appropriate covering position and/or that a shutoff device is positioned next to a clearing section in order for it to take up an appropriate clearing position.

According to one feature of the invention, a first stop member is disposed at a first longitudinal end of the module in contact with the first end portion and a second stop member is disposed at a second longitudinal end of the module in contact with the second end portion.

According to one feature of the invention, each set formed by one of the perforated sections and one of the adjacent clearing sections along the longitudinal direction is flanked longitudinally by two stop members. It will be understood that when the perforated sections are disposed in alternation with the clearing sections, stop members are disposed longitudinally on either side of each set formed by one of the clearing sections and one of the perforated sections in order to block the longitudinal movement in translation of one of the shutoff device associated with said set. If necessary, a stop member may be shared by two adjacent sets, with a first face of the stop member making it possible to block the movement in translation of a shutoff device of the first set and a second face of the stop member making it possible to block the movement in translation of a shutoff device of the second set. It is thus possible to block in position each of the shutoff device associated with each of the sets formed by one of the perforated sections and one of the clearing sections.

According to one feature of the invention, the stop members are collars that protrude from an external surface of the module. In other words, the stop members in the form of collars surround the external surface of the module.

According to one feature of the invention, the at least one evacuation orifice of each of the at least two perforated sections opens onto the space of the pipe and onto an exterior environment of said pipe.

According to one feature of the invention, the at least one evacuation orifice of each of the at least two perforated sections has a passage cross section smaller than or equal to 5 mm.

It will be understood that such a dimension of the passage cross section of the evacuation orifice, for example the diameter of the evacuation orifice when the latter has a circular shape, makes it possible to limit the passage of loose-fill insulating product through said evacuation orifice, most of the fibres of insulating product having a size larger than 5 mm. Such dimensioning of the evacuation orifice thus forms a device for blocking the insulating product, which furthermore allows the pressurized air to pass toward the exterior of the pipe.

According to one feature of the invention, a filtration device is disposed so as to cover each of the at least one evacuation orifice of each of the at least two perforated sections.

The filtration device helps to limit the passage of insulating product through each of the evacuation orifices while allowing the passage of air through the pipe. Such a filtration device can be disposed so as to cover an evacuation orifice of which the passage cross section is smaller than or equal to 5 mm in order to reinforce the effect of blocking the passage of insulating product through said evacuation orifice.

According to one feature of the invention, the filtration devices are gratings comprising a plurality of holes with a cross section smaller than or equal to 5 mm. Beneficially, the filtration devices are made from a flexible material such that the gratings can conform to the shape of the cylindrical wall of the pipe.

According to one feature of the invention, the filtration devices are disposed in the space delimited by the cylindrical wall of the pipe. In other words, the filtration devices are pressed against the internal face of the cylindrical wall. In such a disposition, the filtration devices do not block the sliding of the shutoff device along the cylindrical wall of the pipe.

According to one example of the invention, the filtration device extends along an entire longitudinal dimension of the pipe. In other words, the filtration device extends all along the cylindrical wall delimiting the pipe and in particular all along the internal face of the cylindrical wall. Furthermore, the filtration device may be disposed in the space of the pipe such that a spacing is left between said filtration device and the cylindrical wall, the spacing being able to have a dimension of between 2 mm and 4 mm measured along a straight line perpendicular to the longitudinal direction of the pipe. Benefit is taken of such a feature of the filtration device in that it makes it easier to insert the latter into and hold it in the space of the pipe.

According to one feature of the invention, the at least one evacuation orifice of each of the perforated sections extends in the cylindrical wall along an axis of elongation perpendicular to the longitudinal direction of the pipe.

In other words, the evacuation orifices are straight orifices, meaning that they are respectively defined by a cylindrical shape about an axis of revolution which corresponds here to the axis of elongation of said evacuation orifices and which is substantially perpendicular to the direction of circulation of the air and of the loose-fill insulating product within the duct delimited by the cylindrical wall of the pipe.

According to an alternative of the invention, the at least one evacuation orifice of each of the perforated sections extends in the cylindrical wall along an axis of elongation that is inclined with respect to the longitudinal direction of the pipe. More particularly, the evacuation orifices are respectively inclined such that they extend from the interior to the exterior of the pipe in the direction of the first end portion.

In other words, in this alternative, the evacuation orifices are inclined in the cylindrical wall such that the air passing through them circulates in a direction substantially opposite to the direction of circulation of the mixture of air and insulating product in the space of the pipe, from the first end portion toward the second end portion. Such an inclination makes it possible to limit the passage of the loose-fill insulating product through the evacuation orifice of each of the perforated sections.

According to one feature of the invention, each of the sections extends between the first end portion and the second end portion along an extension dimension measured along the longitudinal direction of the pipe, the extension dimensions of each of the sections being identical to one another and the shutoff devices each having a longitudinal dimension measured along the longitudinal direction of the pipe that is identical to each of the extension dimensions of the sections. It will be understood that such a feature allows each of the shutoff devices to cover the entirety of each of the perforated sections and/or of each of the clearing sections of the module of the pipe.

According to one feature of the invention, at least one of the shutoff device is able to form an intermediate stop member for another, longitudinally adjacent shutoff device.

According to one feature of the invention, each of the perforated sections comprises a plurality of evacuation orifices, the distribution of which over the cylindrical wall forms a pattern, the patterns formed being identical from one perforated section to the other.

According to an alternative of the invention, each of the perforated sections comprises a plurality of evacuation orifices, the distribution of which over the cylindrical wall forms a pattern, the patterns formed being different from one perforated section to the other.

According to one feature of the invention, the plurality of evacuation orifices in each of the perforated sections comprises at least two evacuation orifices having different passage cross sections.

According to one feature of the invention, the shutoff device is a sleeve that slides longitudinally about the cylindrical wall of the pipe.

The invention also relates to a machine for blowing a loose-fill insulating product, comprising at least a base and a pipe for transporting the insulating product according to any one of the preceding features, the base comprising at least an air inlet and an inlet for the loose-fill insulating product, said inlets being connected to the pipe by an air circulation channel and a circulation channel for the loose-fill insulating product, respectively.

According to one feature of the blowing machine, a member for controlling the flow rate is disposed between the circulation channels and the pipe.

The member for controlling the flow rate makes it possible in particular to adjust the flow rate of the mixture of air and insulating product upstream of its inlet into the pipe through the first opening in the latter.

A further aspect of the invention is a method for insulating a zone to be insulated, wherein a loose-fill insulating product is blown by a blowing machine as described above, during which method a user is able to move at least one of the shutoff device in longitudinal translation in order to evacuate a given quantity of air between the base and the second end portion of the pipe.

BRIEF DESCRIPTION OF THE DRAWINGS

Further features, details and benefits of the invention will become more clearly apparent from reading the description given below by way of indication, with reference to the drawings, in which.

DETAILED DESCRIPTION

It should first of all be noted that, while the figures set out the invention in detail for implementing the invention, it will be appreciated that these figures may be used to better define the invention, if necessary. It should also be noted that these figures only set out exemplary embodiments of the invention. Lastly, the same references denote the same elements throughout the figures.

Figure 1:
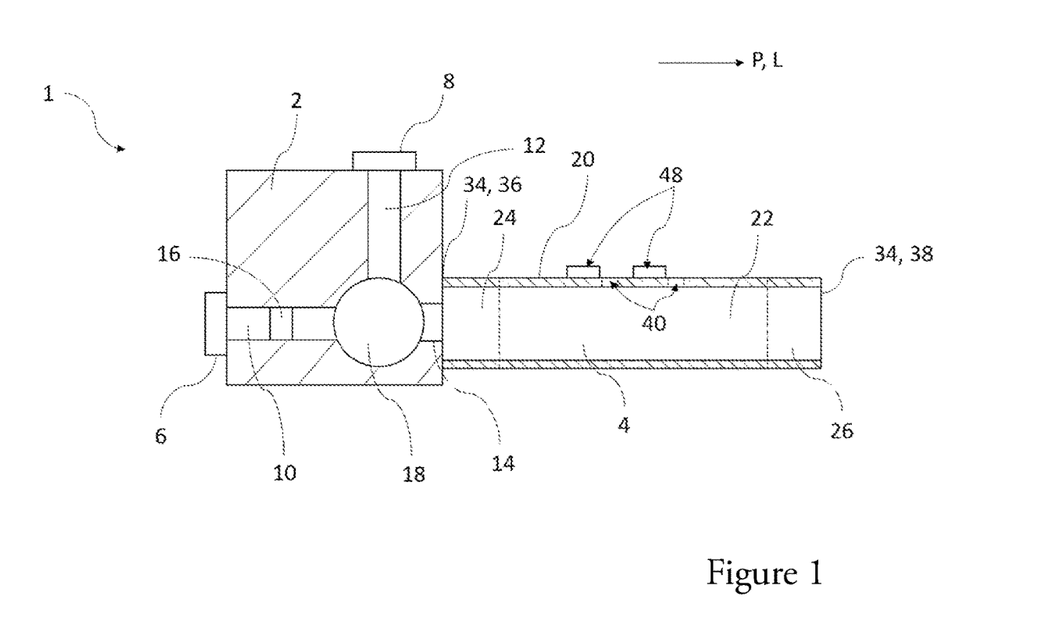
FIG. 1 is a schematic view of a blowing machine, comprising at least a base and a pipe for the transport of a mixture of air and loose-fill insulating product, showing in particular an evacuation orifice and a shutoff device.

FIG. 1 illustrates a machine 1 for blowing a loose-fill insulating product according to an aspect of the invention, comprising at least a base 2 and a pipe 4 for the transport of the insulating product. The base 2 comprises in particular at least an air inlet 6 and an inlet 8 for insulating product that are separate from one another, the inlet 8 for insulating product being connected to a reservoir of loose-fill insulating product that is disposed outside the blowing machine 1 and cannot be seen here. An air circulation channel 10 and a circulation channel 12 for the insulating product each extend in the base 2 of the blowing machine 1, from the air inlet 6 and the inlet 8 for insulating product, respectively, and are connected to an outlet 14 of the base 2 connected to the pipe 4.

In order to allow the circulation of the air at a high flow rate in the air circulation channel 10, the latter may, according to one example of the invention, comprise a ventilation device 16 ensuring the circulation of the air from the air inlet 6 and at least as far as the outlet 14 of the base 2. This ventilation device 16 is furthermore configured and designed to push the mixture of the air and insulating product, under pressure, at least as far as the free end of the pipe 4, on the opposite side from the base, so as to make it easier to spray the mixture in a zone to be insulated of the dwelling.

Still according to the example of the invention in FIG. 1, a member 18 for controlling the flow rate is disposed between the air circulation channel 10, the circulation channel 12 for the insulating product and the outlet 14 of the base 2 and this member for controlling the flow rate may be configured by the user so as to mix the air and the insulating product in given proportions and to modify the quality of the insulation that can be obtained by the spraying of the loose-fill insulating product in the pipe 4.

The pipe 4 according to an embodiment of the invention extends along a main elongation direction P, which in this case is longitudinal L, and comprises at least one cylindrical wall 20 which delimits a space 22 configured for the circulation of the mixture of the loose-fill insulating product with air. The space 22 extends between a first end portion 24 of the cylindrical wall 20 and a second end portion 26 of the cylindrical wall 20 that are at opposite ends from one another along the longitudinal direction L of the pipe 4. As will be described in more detail below, at least one evacuation orifice 40 is arranged in the cylindrical wall and an associated shutoff device 48 is able to cover this evacuation orifice 40, if necessary.

Figure 2:
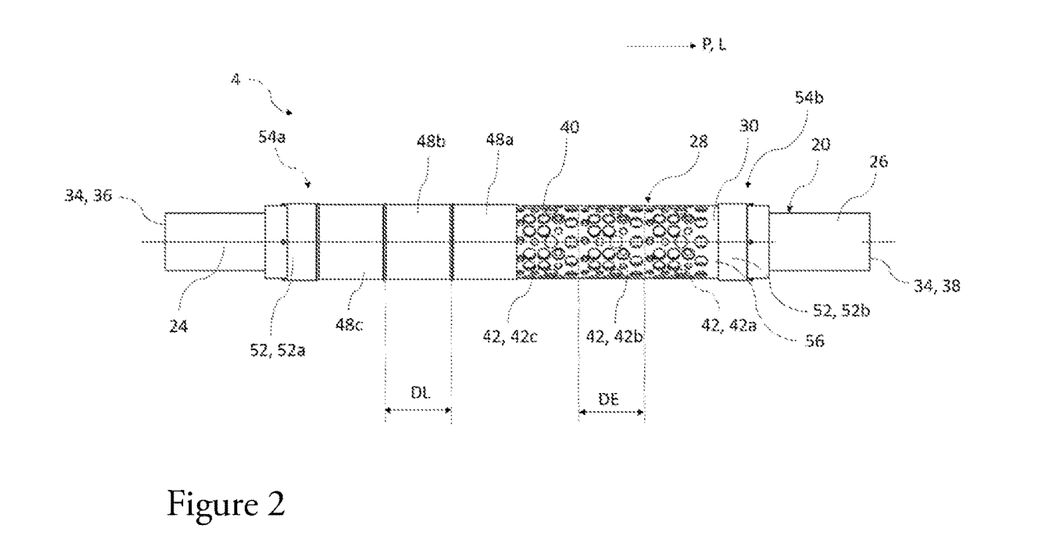
FIG. 2 is a schematic view of a pipe according to a first embodiment of the invention, which is able to equip a blowing machine similar to the one in FIG. 1, comprising at least one section perforated with evacuation orifices and at least one shutoff device.
Figure 3:
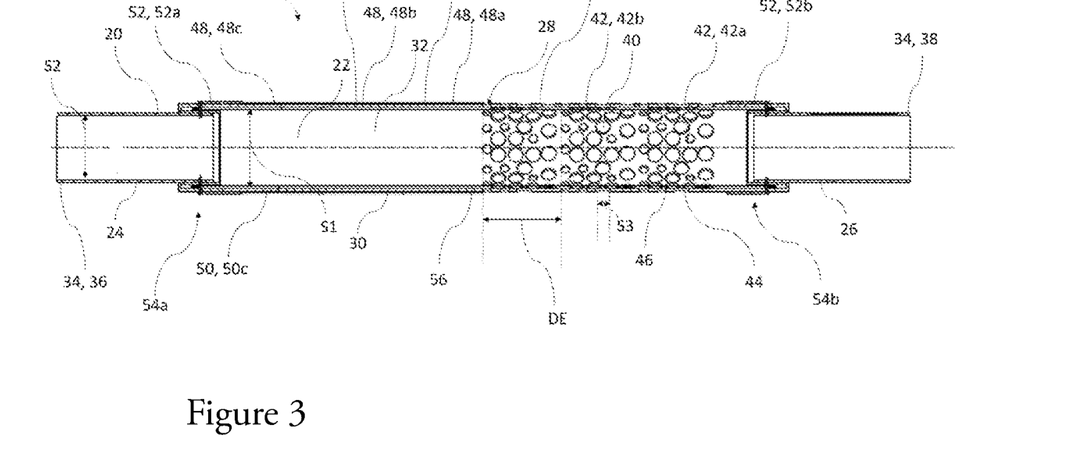
FIG. 3 is a view in longitudinal section of the pipe in FIG. 2.

Referring more particularly to FIGS. 2 and 3, the cylindrical wall 20 of the pipe 4 also comprises a plurality of sections 28 arranged one after another along the longitudinal direction L, between the first end portion 24 and the second end portion 26. More specifically, the cylindrical wall 20 comprises a module 30 on which the plurality of sections 28 of the pipe 4 are formed, the module being fixed to the first end portion 24 on one side and to the second end portion 26 on the other.

In the example illustrated, which can be seen in particular in FIG. 3, a first passage cross section S1 of the module 30 and a second passage cross section S2 of the first end portion 24 and of the second end portion 26 are defined, these being measured on a plane perpendicular to the longitudinal direction L of the pipe 4, and the first passage cross section S1 has a value greater than that of the second passage cross section S2. It will thus be understood that one end of each of the first end portion 24 and of the second end portion 26 is fitted in an internal volume 32 of the module 30, forming part of the space 22 of the pipe 4, and then locked to the module, the joint between the end portions 24, 26 and the module 30 being sealed. Furthermore, it will be understood that free ends 34 of each of the first end portion 24 and of the second end portion 26 respectively form an inlet of the pipe 36 for letting the mixture of insulating product and air into the pipe 4 and an outlet of the pipe 38 for letting the mixture of insulating product and air out of the pipe 4. The inlet of the pipe 36 is thus fluidically connected to the outlet 14 of the base 2 of the blowing machine 1.

According to the different examples of the invention that are illustrated, the pipe 4 comprises six sections 28 formed on the module 30. An extension dimension DE of each of the sections 28 is defined, this being visible in FIG. 3 and measured along the longitudinal direction L of the pipe 4, each of the extension dimensions DE of each of the sections 28 being identical to one another. It should be noted, however, that the number of sections may be different without departing from the context of the invention, as long as this number makes it possible to implement the following, and that the extension dimension may vary from one section to another, as long as, again, the variation in the extension dimensions makes it possible to implement the following.

According to an embodiment of the invention, at least two sections 28 of the pipe 4 each comprise at least one evacuation through-orifice 40, so as to form, among the plurality of sections, at least two perforated sections 42. The term through-orifice is understood to mean that the at least one evacuation orifice 40 in each of the at least two sections 28 of the pipe 4 opens into the space 22 of the pipe 4 and onto the exterior of the pipe 4 so as to form a passage between the interior and the exterior of the cylindrical wall 20 of the pipe 4.

According to the following examples of the invention, a first perforated section 42a, a second perforated section 42b and a third perforated sections 42c are defined, each comprising at least one evacuation orifice 40. It should be borne in mind that all of the features described for the three perforated sections 42a, 42b, 42c apply, mutatis mutandis, to two perforated sections 42 or to more than three perforated sections 42.

Furthermore, at least two shutoff devices 48 are associated with the module and are movable along the longitudinal direction so as to respectively cover one of the perforated sections, when this is considered necessary in order to optimize the flow rate of the mixture formed by the air and the loose-fill insulating product exiting the pipe of the blowing machine. According to the following examples of the invention, a first shutoff device 48a, a second shutoff device 48b and a third shutoff device 48c are defined, these respectively being able to cover the first perforated section 42a, the second perforated section 42b and the third perforated section 42c. Here too, it should be borne in mind that all of the features described for the three shutoff devices 48 apply, mutatis mutandis, to two shutoff devices 48 or more than three shutoff devices 48.

Each evacuation orifice 40, which is separate from the openings formed at each longitudinal end of the pipe, is formed through the cylindrical wall 20 of the pipe 4. More specifically, the evacuation orifice 40 forms a passage between the internal space 22 of the pipe 4, where the mixture of air and insulating product circulates, and an exterior environment of the blowing machine 1. In other words, a part of the flow circulating within the pipe is able to escape from the pipe through each of the evacuation orifices.

Each evacuation orifice 40 is more particularly configured to allow the passage of air toward the exterior of the pipe 4, while blocking the passage of the loose-fill insulating product toward the exterior of said pipe 4. In other words, the evacuation orifice 40 allows the evacuation of a part of the air circulating in the space 22 within the pipe while channeling the insulating product within the pipe 4 in order to carry it from the first end portion 24 to the second end portion 26. To this end, the evacuation orifice may have appropriate dimensions for blocking the loose-fill insulating product, or be associated with a filtration device, which will be described below.

Figure 4:
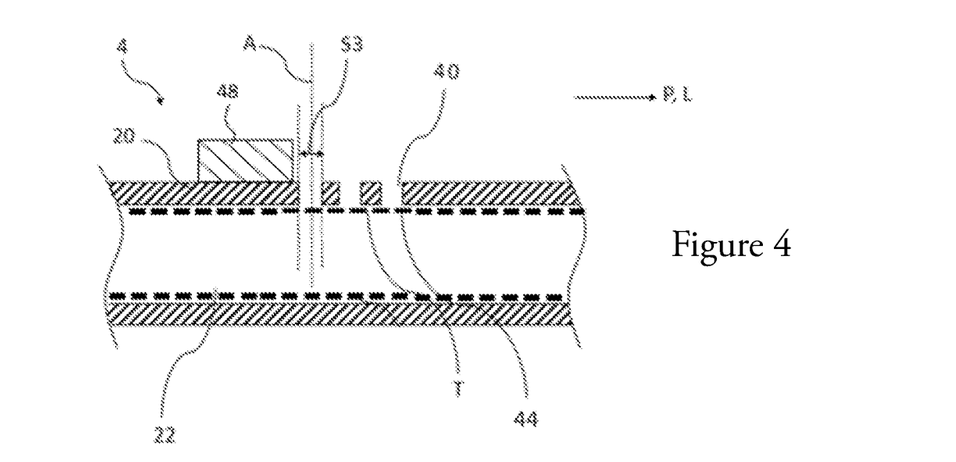
FIG. 4 is a cross-sectional detail view showing the orientation of an evacuation orifice according to one exemplary embodiment, and also showing a filtration device that is able to equip the pipe according to an aspect of the invention.

With reference to FIGS. 3 and 4, the evacuation holes may, according to an embodiment of the invention, have different orientations. Each evacuation orifice 40 of each of the perforated sections 42 may be defined by a cylindrical shape about an axis of elongation A, or axis of revolution. Each evacuation orifice may consist of a straight orifice, meaning one with an axis of elongation A which is perpendicular to the longitudinal direction L of the pipe 4, as illustrated in FIG. 3. According to another example of the invention, illustrated in FIG. 4, each evacuation orifice may be inclined, meaning that it extends in the cylindrical wall such that its axis of elongation A is inclined with respect to the longitudinal direction of the pipe at an angle of, for example, between 10° and 80°. Furthermore, and still according to this other example of the invention, at least one evacuation orifice may have a countercurrent inclination with respect to the flow of air and loose-fill insulating product. In other words, this evacuation orifice extends, from the interior of the pipe to the exterior environment, in the direction of the inlet of the pipe formed at the free end of the first end portion of the pipe. Benefit is taken of such a countercurrent configuration in that it makes it possible to limit the clogging of the evacuation orifice by the loose-fill insulating product while it circulates in the space of the pipe, said insulating product circulating from the first end portion to the second end portion.

Independently of the orientation of the evacuation orifices, each of the evacuation orifices 40 may have a third passage cross section S3, measured on a plane perpendicular to its axis of elongation A, which is less than or equal to 5 mm. Such a dimension of the passage cross section of the evacuation orifice makes it possible to limit the passage of the loose-fill insulating product through the evacuation orifices 40, fibers of said loose-fill insulating product usually having a diameter greater than 5 mm.

As mentioned above, and as can be seen in particular in FIGS. 4 and 5, a filtration device 44 may be disposed so as to cover the at least one evacuation orifice 40 in each of the perforated sections 42. The filtration device 44 may be, for example, a grating comprising a plurality of holes 46 with a passage cross section T allowing the passage of air while blocking the passage of the loose-fill insulating product. By way of example, the passage cross section T of each of the holes may be smaller than or equal to 5 mm. In the example illustrated here, the grating is disposed in addition to what was described above in relation to the dimension of the passage cross sections S3 of the evacuation orifices, but it should be noted that the use of the grating could be independent, being associated with evacuation orifices with a large passage cross section, the filtration of the loose-fill insulating product then being ensured only by the grating.

Figure 5:
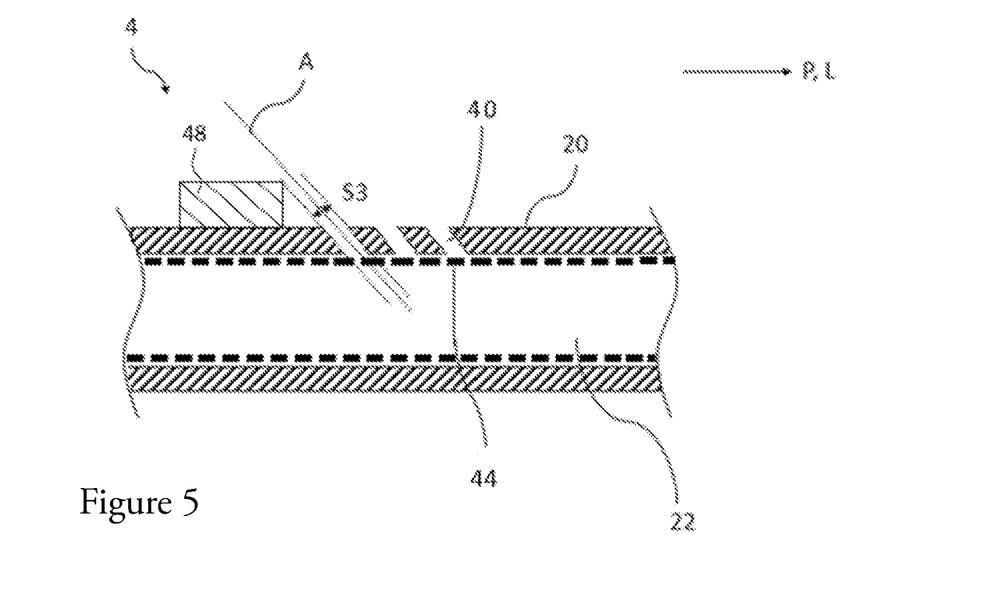
FIG. 5 is a view similar to the one in FIG. 4, with an evacuation orifice oriented according to an alternative embodiment.

The filtration device 44 is disposed against a face of the cylindrical wall 20, covering the entire evacuation orifice. To this end, the filtration device 44 is made from a flexible material, making it possible to give the filtration device a partially cylindrical shape with a curvature identical to that of the cylindrical wall. The filtration device is disposed in particular in the space, within the cylindrical wall 20 defining the pipe 4. Such positioning of the filtration device, against the internal face of the cylindrical wall, makes it possible in particular not to form a protuberance on the external face of the cylindrical wall of the pipe, on the exterior of the latter, and therefore not to block the movement in translation of one of the shutoff devices 48.

As can be seen in FIGS. 4 and 5, the filtration device 44 can be disposed in the space 22 all along the cylindrical wall 20 of the pipe 4, that is to say along more or less the entire longitudinal dimension between the first opening 24 formed at the first end 26 of the pipe 4 and the second opening 28 formed at the second end 30 of the pipe 4, so as to form a cylindrical sleeve in the space 22 of the pipe 4. Such dimensioning of the filtration device 44 makes it possible to ensure that each of the evacuation orifices is covered properly and makes it easier to position and keep the filtration device 44 in the space 22 of the pipe 4. More particularly, the filtration device extends all along the internal face of this cylindrical wall 20.

Furthermore, a spacing may be provided between the cylindrical wall 20 and the filtration device 44 such that these are not in contact with one another. According to one nonlimiting example of the invention, the spacing may have a dimension, measured perpendicularly to the internal face of the cylindrical wall, of between 2 mm and 4 mm.

The shutoff devices 48 are in this case each in the form of a sleeve that is able to slide about the cylindrical wall 20 of the pipe 4, and more specifically about the module 30. More specifically, each shutoff device is movable in longitudinal translation along the module 30 between a first, clearing position, which is such that the evacuation orifices are not covered by the corresponding shutoff device and can allow the air to pass to the exterior of the pipe, and a second, covering position, which is such that all of the evacuation orifices in a perforated section are covered by the corresponding shutoff device and air cannot exit the pipe other than through the second end, with the loose-fill insulating product.

In other words, each shutoff device 48 is associated with a perforated section 42 and it is able to cover, in a second, covering position, or uncover, in a first, clearing position, this perforated section that is associated with it, in order to block or allow the passage of the air through the latter. The movement in translation of the shutoff device 48 may in particular be controlled manually by a user of the blowing machine 1, or via electronic remote-controller, which is not shown here.

Furthermore, each shutoff device 48 may be moved into and held in position in an intermediate position between the first, clearing position and the second, covering position. In other words, each of the shutoff device 48 may partially cover the perforated section 42 with which it is associated.

In this context, it is possible to define a longitudinal dimension DL of each of the shutoff device 48, which can be seen in FIG. 2 and is measured along the longitudinal direction L of the pipe 4, the longitudinal dimension DL of each of the shutoff device 48 being identical to each of the abovementioned extension dimensions DE of the sections 28.

It will be understood from the above that each of the movable shutoff device 48 is able to cover the entirety of the perforated section 42 associated with it, by being movable in translation along the cylindrical wall 20 of the pipe 4 along its longitudinal direction L. The module 30 has, in the plurality of sections, at least two clearing sections 50, which are separate from the perforated sections 42 and do not have evacuation orifices. More specifically, as many clearing sections 50 are provided as there are perforated sections and closure device 48, each shutoff device being configured to move between its first, clearing position, in which it is next to a clearing section dedicated to it, and its second, covering position, in which it is next to a perforated section dedicated to it. In the example illustrated, a first clearing section 50*a*, a second clearing section 50*b* and a third clearing section 50*c* are defined, which are separate from the three perforated sections 42. It will furthermore be understood that the following features of the three clearing sections 50 apply, mutatis mutandis, to a configuration with two clearing sections 50 and with more than three clearing sections 50.

As has just been mentioned, each of the three shutoff devices 48 is able to take up a covering position completely covering one of the perforated sections 42, an intermediate position partially covering one of the perforated sections 42, and a clearing position completely covering one of the clearing sections 50.

A more detailed description will now be given of a first embodiment, with reference to FIGS. 2 to 8, in which the perforated sections 42, of which there are therefore three here, are disposed one after another along the longitudinal direction L of the pipe 4 and in which the clearing sections 50, of which there are therefore three here, are disposed one after another along the longitudinal direction L of the pipe 4.

In the example illustrated, the three perforated sections 42 are formed on the module 30 such that they are closer to the second end portion 26 of the cylindrical wall 20 than to its first end portion 24. In other words, the evacuation orifices 40 are closer to the outlet of the mixture of air and loose-fill insulating product from the pipe 4 than to the inlet thereof into said pipe 4, in order that the pressure and the circulation flow rate in the space 22 of the pipe 4 remain sufficient to carry the mixture from the inlet to the outlet of the pipe 4. This allows effective evacuation of a part of the air circulating in the space 22 of the pipe 4 while maintaining a sufficient spray of the mixture exiting the pipe 4.

In this context, and as can be seen in the figures, the three clearing sections 50 are formed on the module 30 such that they are closer to the first end portion 24 of the pipe 4 than to the second end portion 26 with respect to the longitudinal direction L and are thus disposed between the first end portion of the pipe and the perforated sections 42.

Furthermore, the arrangement of the perforated sections 42 on the module 30 is such that the first perforated section 42*a* is closest to the second end portion 26 of the pipe 4, the third perforated section 42*c* being farthest away from this second end portion 26, while the arrangement of the clearing sections 50 on the module 30 is such that the third clearing section 50*c* is closest to the first end portion 24, the first clearing section 50*a* being farthest away from the first end portion 24. As a result, the first clearing section 50*a* is in the vicinity of the third perforated section 42*c* and these two sections are adjacent in the example illustrated.

The pipe comprises stop members 52 for the movement in translation of the shutoff device 48 in order that these can take up an appropriate position next to the perforated sections or the clearing sections. More specifically, a first stop member 52*a* is disposed at a first longitudinal end 54*a* of the module 30 in contact with the first end portion 24 of the pipe 4 and a second stop member 52*b* is disposed at a second longitudinal end 54*b* of the module 30 in contact with the second end portion 26 of the pipe 4. According to one example of the invention, each of the first stop member 52*a* and the second stop member 52*b* is in the form of a collar protruding from an external surface 56 of the module 30. In other words, each of the stop members 52*a*, 52*b* forms an overthickness around the module 30 at each of its first longitudinal end 54*a* and its second longitudinal end 54*b*, the overthickness blocking the movement in translation of the shutoff device 48 along the longitudinal direction L.

Figure 6:
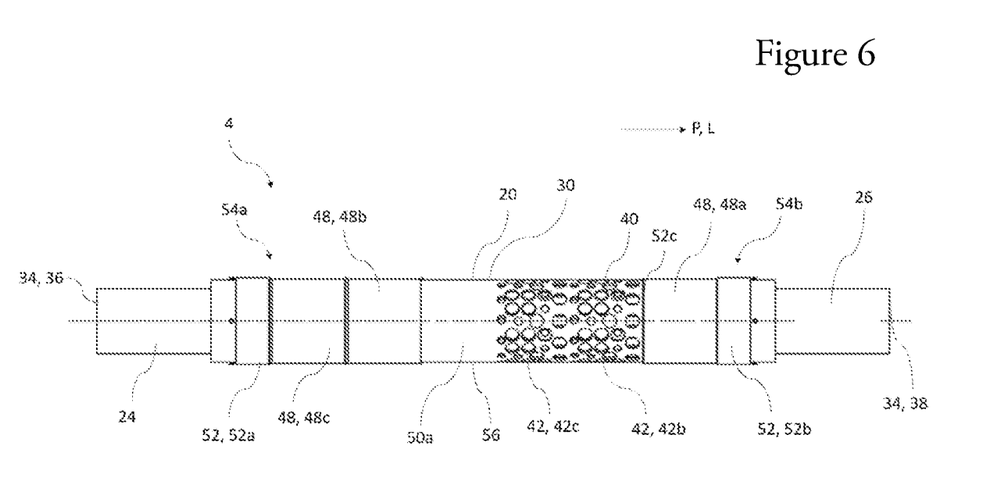
FIG. 6 is a schematic view of the pipe in FIG. 2, in which a first shutoff device is disposed so as to cover a first perforated section, two perforated sections remaining uncovered.

In this arrangement, FIGS. 2 and 6 illustrate more particularly the possible positions of the first shutoff device 48*a*, which is movable in translation between a clearing position, visible in FIG. 2, in which it completely covers the first clearing section 50*a*, and a covering position, visible in FIG. 6, in which it completely covers the first perforated section 42*a*. In its clearing position, the first shutoff device 48*a* is in abutment against the other shutoff device and it is adjacent to the third perforated section 42*a*, without covering it. To reach its covering position, the first shutoff device 48*a* is moved in translation as far as the second stop member 52*b*, arranged at one end of the module 30, and, in this position, it completely covers the first perforated section 42*a*, leaving the second perforated section 42*b*, directly adjacent to the first perforated section, uncovered.

It is notable that, in this first embodiment, this first shutoff device 48*a* needs to be moved first when the set of shutoff device is initially in a clearing position, since, in its clearing position, it is in abutment against the other shutoff device and more particularly in this case against the second shutoff device 48*b*.

Figure 7:
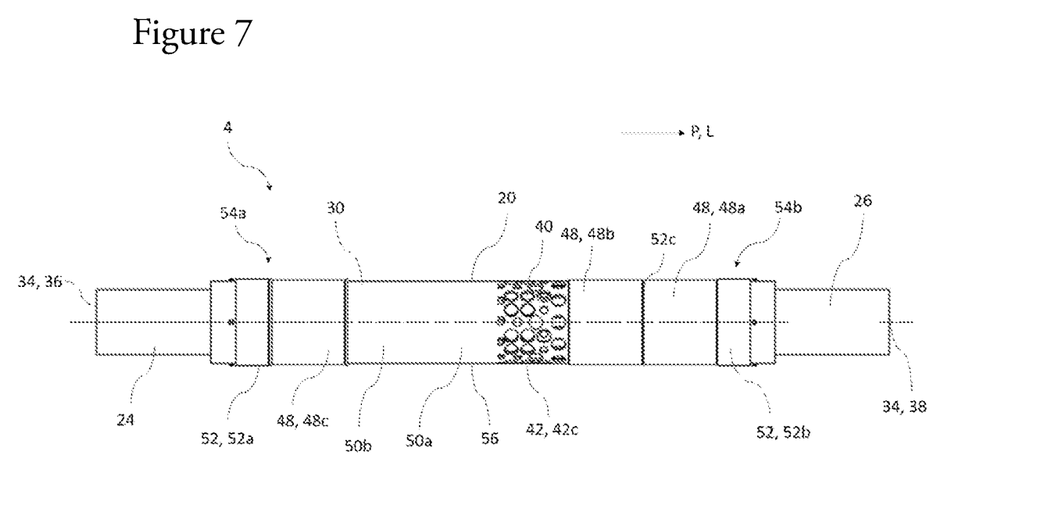
FIG. 7 is a view similar to the one in FIG. 6, in which a second shutoff device is disposed so as to cover a second perforated section, in addition to the covering of the first perforated section by the first shutoff device, a single perforated section remaining uncovered.
Figure 8:
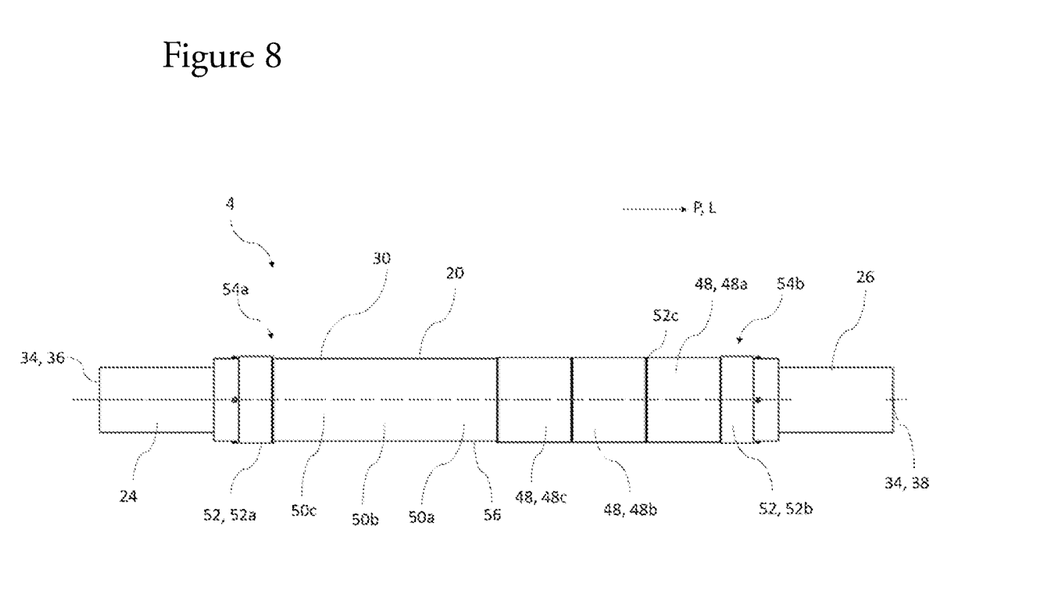
FIG. 8 is a view similar to the one in FIGS. 6 and 7, in which a third shutoff device is disposed so as to cover a third perforated section, all of the perforated sections then being covered.

The movement of the second shutoff device 48*b* is made possible when the first shutoff device 48*a* is in the covering position, away from the clearing sections, and is no longer in abutment against the other shutoff device. FIGS. 2 and 7 illustrate more particularly the possible positions of this second shutoff device 48*b*, which is movable in translation between a clearing position, visible in FIG. 2, in which it completely covers the second clearing section 50*a*, in abutment against the third shutoff device, and a covering position, visible in FIG. 7, in which it completely covers the second perforated section 42*b*. To reach its covering position, the second shutoff device 48*a* is moved in translation as far as the first shutoff device already in position covering the first perforated section 42*a*, this first shutoff device forming an intermediate stop member that makes it possible to ensure that the second shutoff device will completely cover the second perforated section 42*b*, while leaving the third perforated section 42*c*, directly adjacent to the second perforated section, uncovered.

Benefit is taken of the fact that each of the shutoff device 48 has a longitudinal dimension DL identical to the extension dimension DE of its associated perforated section, in that this allows the shutoff device 48 already in a covering position to form a longitudinal stop for an adjacent shutoff device 48 that is going to take up such a covering position. Thus, as illustrated in FIG. 7, the first shutoff device 48*a* positioned so as to cover the first perforated section 42*a* forms an intermediate stop member 52*c* for the second shutoff device 48*b* when the latter slides longitudinally from the second clearing section 50*b* toward the second perforated section 42*b*, and it is the same in FIG. 8 between the second shutoff device 48*b* and the third shutoff device 48*c*, when the second shutoff device 48*b* is already positioned so as to cover the second perforated section and forms an intermediate stop member for the third shutoff device 48*c* when the latter slides longitudinally from the third clearing section 50*c* toward the third perforated section 42*c*.

As a result of the foregoing, the movement of the shutoff device can only take place in a specific order, depending on whether the shutoff devices are intended to be moved from a covering position to a clearing position or vice versa. By way of example, the second shutoff device 48*b* can only be moved if the first shutoff device 48*a* and/or the third shutoff device 48*c* are in positions that allow the second shutoff device to be moved.

Each of the perforated sections 42 may comprise a plurality of evacuation orifices 40. More particularly, in the first embodiment of the invention illustrated in FIGS. 2 to 8, the perforated sections 42 comprise a number, dimensioning and distribution of the evacuation orifices 40 that are identical from one perforated section 42 to another. In other words, the evacuation orifices 40 of each of the perforated sections 42 form an identical pattern from one perforated section 42 to another.

By way of example, at least two evacuation orifices 40 of a perforated section 42 may have different passage cross sections S3, as long as these remain equal to or smaller than a value of 5 mm as described above, and/or as long as the evacuation orifices are covered, in particular next to an internal face of the cylindrical wall, by a filtration device as mentioned above. Such a configuration with evacuation orifices with different passage cross sections may in particular be coupled with the possibility of having intermediate positions of the shutoff device 48, in order to create a large number of air passage stages that are different from one another.

A second embodiment of the invention will now be described with reference to FIGS. 9 and 10. It should be borne in mind that all of the structural and functional features of the pipe 4 that are described in the first embodiment apply, mutatis mutandis, to the second embodiment and that only the features that are different than the first embodiment will be described. For the features in common, reference should therefore be made to the first embodiment.

In this second embodiment of the pipe 4, each of the perforated sections 42, of which there are again, for example, three, is disposed in alternation with each of the clearing sections 50 along the longitudinal direction L of the pipe 4. Thus, the module 30 comprises, from its second longitudinal end 54*b* to its first longitudinal end 54*a*, the first perforated section 42*a*, the first clearing section 50*a*, the second perforated section 42*b*, the second clearing section 50*b*, the third perforated section 42*c* and the third clearing section 50*c*. The clearing section associated with a perforated section is thus directly adjacent thereto and the shutoff device intended to be moved in translation between a position next to this clearing section and a position next to this perforated section thus needs to travel a smaller distance in order to pass from one position to the other.

In contrast to what was described above in respect of the first exemplary embodiment, the shutoff device then cannot serve as a stop for the positioning of another shutoff device, since each shutoff device can be manipulated independently of the others. Thus, according to this second embodiment of the invention, each set formed by one of the perforated sections 42 and one of the clearing sections 50 is flanked by two stop members 52. More specifically, the module comprises the first stop member 52*a* and the second stop member 52*b* respectively at its first longitudinal end 54*a* and its second longitudinal end 54*b*, and also comprises a third stop member 52*d* between the first clearing section 50*a* and the second perforated section 42*b*, and a fourth stop member 52*e* between the second clearing section 50*b* and the third perforated section 42*c*. The third stop member 52*d* and the fourth stop member 52*e* may be in the form, for example, of a lug protruding from the external surface 56 of the module 30 or of a ring surrounding said module 30.

Figure 9:
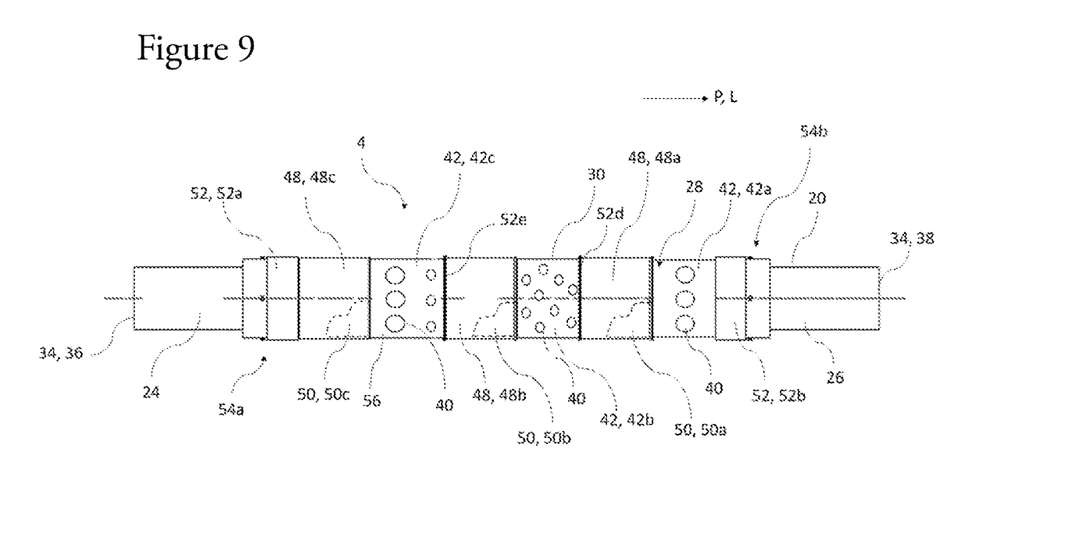
FIG. 9 is a schematic view of a pipe according to a second embodiment of the invention, which is able to equip a blowing machine similar to the one in FIG. 1, in a configuration in which all of the perforated sections are uncovered.

As a result, the first shutoff device 48*a* is able to move in translation between a clearing position, which is visible in FIG. 9 and in which it is against a first face of the third stop member 52*d* and next to the first clearing section 50*a*, and a covering position, which is not illustrated here and in which it is against a face of the second stop member 52*b* and next to the first perforated section 42*a*.

Analogously, the third shutoff device 48*c* is able to move in translation between a clearing position, which is visible in FIG. 9 and in which it is against a face of the first stop member 52*a* and next to the third clearing section 50*c*, and a covering position, which is not illustrated here and in which it is against a face of the fourth stop member 52*e* and next to the third perforated section 42*c*.

Figure 10:
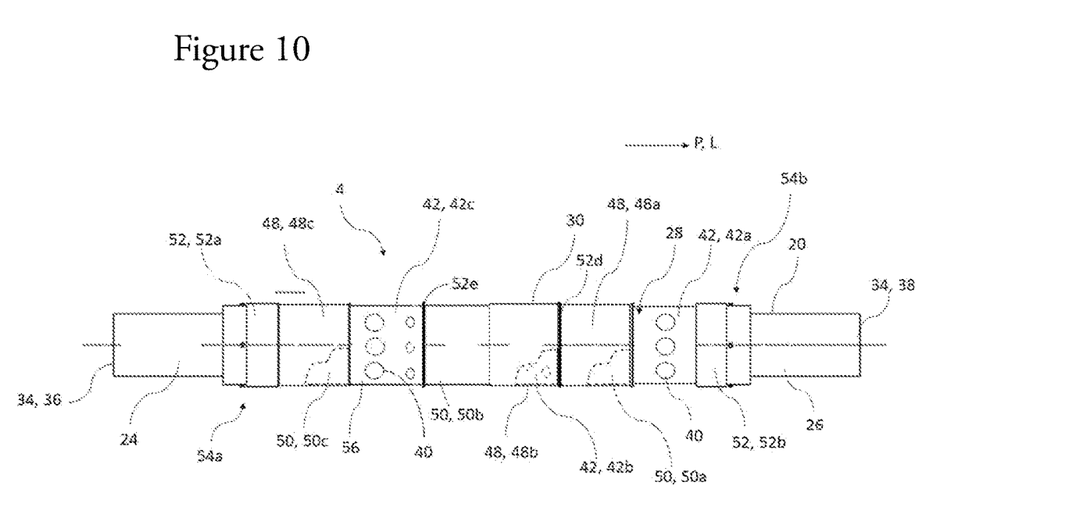
FIG. 10 is a view similar to the one in FIG. 9, in a configuration in which one of the perforated sections is covered by the shutoff device that is associated with it.

The second shutoff device is able to move analogously, and FIG. 10 illustrates the covering position of this second shutoff device, in which it is against a second face of the third stop member 52*d* so as to be next to the second perforated section 42*b*. It should be noted that, in this second embodiment, the second shutoff device has been able to be moved without the two other shutoff devices being moved.

As can be seen in FIG. 5, each of the perforated sections 42 comprises a plurality of evacuation orifices 40 that each have a distribution on the module 30 that is different from one perforated section 42 to another. In other words, there may be a different number of evacuation orifices 40, with different passage cross sections, in one perforated section 42 compared with an adjacent perforated section. As a result, the quantity of air that can exit the pipe is different from one perforated section to the other, and the impact of the covering of a perforated section by a shutoff device on the flow rate of the mixture circulating in the pipe is different depending on which perforated section the user decides to shut off.

Benefit is taken of the pipe as has just been described in that it makes it possible, by way of simple device, namely the perforated sections and the movable shutoff device, to provide an operation of blowing loose-fill insulating product that can be adapted to confined environments in which the loose-fill insulating product is intended to be deposited while avoiding raising too much dust during spraying and/or can provide insulation in which the loose-fill insulating product is not excessively compacted under the effect of too high an air pressure.

The invention as has just been described is not, however, limited to the devices, systems and configurations exclusively described and illustrated, but also applies to any equivalent devices, systems or configurations and to any combination of such devices, systems or configurations.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

It will be appreciated that the various embodiments described previously are combinable according to any technically permissible combinations.

The invention claimed is:

1. A pipe for the transport of a loose-fill insulating product for a machine for blowing the insulating product, the pipe extending along a longitudinal main elongation direction and comprising: at least one cylindrical wall which delimits a space configured for a circulation at least of the loose-fill insulating product, the cylindrical wall comprising at least a first end portion and a second end portion that are opposite ends from one another along the longitudinal direction, wherein, in the pipe, the cylindrical wall comprises a plurality of sections between its first end portion and its second end portion, at least two of the sections each comprising at least one evacuation orifice so as to form at least two perforated sections, the pipe further comprising at least two shutoff devices that are movable in translation along the longitudinal direction about the cylindrical wall, each of the shutoff devices being able to cover specifically one of the perforated sections, wherein the at least one evacuation orifice of each of the at least two perforated sections has a passage cross section less than or equal to 5 mm.

2. The transport pipe as claimed in claim 1, wherein at least two of the sections are clearing sections separate from the perforated sections, each shutoff device being able to take up a covering position in which it is next to one of the perforated sections and a clearing position in which it is next to one of the clearing sections.

3. The transport pipe as claimed in claim 2, wherein the at least two perforated sections are disposed one after the other along the longitudinal direction of the pipe, the at least two clearing sections being disposed one after the other along the longitudinal direction of the pipe.

4. The transport pipe as claimed in claim 2, wherein the perforated sections are disposed in a manner alternating with the clearing sections, along the longitudinal direction of the pipe.

5. The transport pipe as claimed in claim 1, wherein the at least one evacuation orifice of each of the at least two perforated sections opens onto the space of the pipe and onto an exterior environment of said pipe.

6. The transport pipe as claimed in claim 1, wherein a filter is disposed so as to cover each of the at least one evacuation orifice of each of the at least two perforated sections.

7. The transport pipe as claimed in claim 1, wherein each of the sections extends between the first end portion and the second end portion along an extension dimension measured along the longitudinal direction of the pipe, the extension dimensions of each of the sections being identical to one another and the shutoff devices each having a longitudinal dimension measured along the longitudinal direction of the pipe that is identical to each of the extension dimensions of the sections.

8. The transport pipe as claimed in claim 1, wherein each of the perforated sections comprises a plurality of evacuation orifices, a distribution of which over the cylindrical wall forms a pattern, the patterns formed being identical from one perforated section to the other.

9. The transport pipe as claimed in claim 8, wherein the plurality of evacuation orifices in each of the perforated sections comprises at least two evacuation orifices having different passage cross sections.

10. The transport pipe as claimed in claim 1, wherein each of the perforated sections comprises a plurality of evacuation orifices, a distribution of which over the cylindrical wall forms a pattern, the patterns formed being different from one perforated section to the other.

11. The transport pipe as claimed in claim 10, wherein the plurality of evacuation orifices in each of the perforated sections comprises at least two evacuation orifices having different passage cross sections.

12. The transport pipe as claimed in claim 1, wherein the shutoff device is a sleeve that slides longitudinally about the cylindrical wall of the pipe.

13. A machine for blowing a loose-fill insulating product, comprising: at least a base and a pipe for transporting the insulating product as claimed in claim 1, the base comprising at least an air inlet and an inlet for the loose-fill insulating product, said inlets being connected to the pipe by an air circulation channel and a circulation channel for the loose-fill insulating product, respectively.

14. A method for insulating a zone to be insulated, the method comprising blowing a loose-fill insulating product by a blowing machine as claimed in claim 13, the method comprising moving at least one of the shutoff devices in longitudinal translation in order to evacuate a given quantity of air between the base and the second end portion of the pipe.

15. The pipe of claim 1, wherein each shutoff device is a shutoff cover.

16. A pipe for the transport of a loose-fill insulating product for a machine for blowing the insulating product, the pipe extending along a longitudinal main elongation direction and comprising: at least one cylindrical wall which delimits a space configured for a circulation at least of the loose-fill insulating product, the cylindrical wall comprising at least a first end portion and a second end portion that are opposite ends from one another along the longitudinal direction, wherein, in the pipe, the cylindrical wall comprises a plurality of sections between its first end portion and its second end portion, at least two of the sections each comprising at least one evacuation orifice so as to form at least two perforated sections, the pipe further comprising at least two shutoff devices that are movable in translation along the longitudinal direction about the cylindrical wall, each of the shutoff devices being able to cover specifically one of the perforated sections, wherein the plurality of sections is formed on a module of the cylindrical wall which is arranged between the first end portion and the second end portion of the cylindrical wall of the pipe.

17. The transport pipe as claimed in claim 16, wherein the module comprises stop members for the movement in translation of the shutoff device.

18. The pipe of claim 16, wherein each shutoff device is a shutoff cover.

19. A machine for blowing a loose-fill insulating product, comprising:
a blower comprising at least a base, the base comprising an air inlet, an inlet for receiving the loose-fill insulating product, and an outlet, said inlets being connected to the outlet by an air circulation channel and a circulation channel for the loose-fill insulating product, respectively, wherein the blower is constructed to mix air from the air inlet and loose-fill insulating product to generate a pressurized mixture comprising the air and the loose-fill insulating product for delivery through the outlet;
a pipe fluidly communicated to the outlet for transporting the mixture and having a pipe outlet for output of the mixture, the pipe extending along a longitudinal main elongation direction and comprising:
(a) at least one cylindrical wall which delimits a space configured for a circulation at least of the mixture comprising the air and the loose-fill insulating product, the cylindrical wall comprising at least a first end portion and a second end portion that are opposite ends from one another along the longitudinal direction, wherein, in the pipe, the cylindrical wall comprises a plurality of sections between its first end portion and its second end portion, at least two of the sections each comprising at least one evacuation orifice so as to form at least two perforated sections, and (b) at least two shutoff covers that are movable in translation along the longitudinal direction about the cylindrical wall, each of the shutoff devices being configured to selectively cover specifically one of the perforated sections to adjust an amount of air evacuating the pipe via the evacuation orifices and thereby adjust a pressure and flow rate of the mixture comprising the air and the loose-fill insulating product through the pipe.

* * * * *